(12) United States Patent
Schwinn

(10) Patent No.: US 6,312,786 B1
(45) Date of Patent: *Nov. 6, 2001

(54) COMPOSITE SHEET AND METHOD OF MANUFACTURE THEREOF

(75) Inventor: Georg Schwinn, Gronau (DE)

(73) Assignee: Nordenia Technologies GmbH, Gronau (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,402

(22) Filed: Jul. 17, 1996

(30) Foreign Application Priority Data

Jul. 17, 1995 (DE) ................................. 195 26 044
Mar. 5, 1996 (DE) ................................. 196 08 453

(51) Int. Cl.⁷ .............................. D06N 7/04; B32B 3/00; B32B 5/16; B32B 18/00

(52) U.S. Cl. .......................... 428/143; 428/147; 428/148; 428/149; 428/150; 428/166; 428/325; 428/327; 428/328; 428/330; 428/331

(58) Field of Search ................................. 428/143, 144, 428/147, 149, 150, 148, 325, 327, 328, 330, 331, 166, 168, 476.3, 480, 521, 519; 156/229; 264/147, DIG. 8

(56) References Cited

U.S. PATENT DOCUMENTS

| | | | |
|---|---|---|---|
| 4,103,053 | * 7/1978 | Barehas | 428/40 |
| 4,118,438 | * 10/1978 | Matsui et al. | 260/857 L |
| 4,205,109 | * 5/1980 | France et al. | 428/150 |
| 4,377,616 | * 3/1983 | Ashcraft et al. | 428/213 |
| 4,386,125 | * 5/1983 | Shiraki et al. | 428/36 |
| 4,501,783 | * 2/1985 | Hiragami et al. | 428/147 |
| 4,701,369 | * 10/1987 | Duncan | 428/313.9 |
| 4,880,682 | 11/1989 | Hazelton et al. | 428/152 |
| 5,084,121 | * 1/1992 | Lammers et al. | 156/243 |
| 5,344,691 | 9/1994 | Hanschen et al. | 800/205 |
| 5,395,673 | * 3/1995 | Hunt | 428/148 |
| 5,468,428 | 11/1995 | Hanschen et al. | 264/483 |
| 5,601,900 | * 2/1997 | Doscher | 428/149 |

FOREIGN PATENT DOCUMENTS 0 521 883B1   8/1996   (EP).

* cited by examiner

Primary Examiner—Paul Thibodeau
Assistant Examiner—Holly C Rickman
(74) Attorney, Agent, or Firm—Milde, Hoffberg & Macklin, LLP

(57) ABSTRACT

The invention concerns a multiple-layer composite sheet and a method of manufacturing such a sheet. The composite sheet comprises a supporting sheet bonded to a "hetero sheet". The hetero sheet consists of a heterogeneous blend of an elastic thermoplastic fundamental substance that cures semicrystalline or amorphous subsequent to processing and particles of added material distributed therein. The particles can be mixed and extruded along with the fundamental substance although they are heterogeneously bound therein. In the hetero sheet the particles of added material heterogeneously distributed therein are detached, by stretching for example, from the surrounding fundamental substance (2) and the material of the hetero sheet stands up at the many areas of detachment to create a fleecy surface. At least one hetero sheet (20) is enclosed in at least one supporting sheet (10 & 30).

13 Claims, 3 Drawing Sheets

COMPOSITE SHEET AND METHOD OF MANUFACTURE THEREOF

BACKGROUND OF THE INVENTION

The present invention concerns a composite sheet.

Various methods of manufacturing composite sheets are known in the art. All have various drawbacks.

SUMMARY OF THE INVENTION

The principal object of the present invention is to provide a novel method of manufacturing a composite sheet, and a composite sheet produced by the method, which overcomes the drawbacks of the prior art.

The composite sheet according to the invention comprises a supporting sheet bonded to a "hetero sheet" consisting of (1) a heterogeneous blend of an elastic thermoplastic matrix that cures semicrystalline or amorphous subsequent to processing, and (2) particles of added material distributed therein. The particles can be mixed and extruded along with the matrix although they are heterogeneously bound therein. In the hetero sheet the particles of added material heterogeneously distributed therein are detached from the surrounding matrix at their interfaces therewith and the material of the hetero sheet stands up at the many areas of detachment to create a fleecy surface.

Such a composite sheet can be produced from many different fundamental materials. The fundamental material of the hetero sheet can be a polymer in the form of a polyolefin, a polyamide, a polycarbonate, or a polyester or a copolymer thereof. The particles must be of a material that cannot be processed adhesively with the fundamental material. Appropriate added materials are, for example, such inorganic fillers as titanium dioxide, lampblack, kaolin, ground quartz, silicic acid, chalk, and lithopone.

It is, however, also possible, and indeed recommended to pair off the polymers in the hetero sheet, with each member being an organic substance, polystyrene or polyamide particles with a matrix in the form of a polyolefin, especially polyethylene or polypropylene, or other pairs of polymers that cannot be processed mutually adhesively, for example.

The supporting sheet will preferably be of elastomer, thermoplastic rubber for example, a copolymer of styrene, butadiene, and styrene, an SBR elastomer, or EPDM (ethylene-propylene rubber).

The hetero sheet can be bonded to one or to both sides of the supporting sheet, with various types of material added. The hetero sheet can be bonded to the supporting sheet with a thermoplastic adhesive. The supporting sheet can consist of several layers.

Methods of manufacturing such composite sheets can be based on different principles.

One such method comprises the steps that will now be described. As this term is used herein, the "hetero sheet" comprises a heterogenous blend of an elastic thermoplastic matrix that cures semicrystalline or amorphous with, distributed therein, one or more particles of an added material that can be mixed and extruded with the matrix but are heterogeneously bound therein. The hetero sheet is bonded to a supporting sheet consisting of an elastomer that can be stretched to a considerable extent and can return to its original or optionally to a slightly lower order of magnitude. The composite sheet is stretched to an extent below the maximal extent that the supporting sheet can be stretched to. The hetero sheet is likewise stretched and the distributed particles of added material simultaneously detach from the thermoplastic matrix enclosing them at the interfaces therewith in such a way that, as the stretched supporting sheet is released, it either returns to its original configuration or remains extensively stretched, whereas the material of the hetero sheet stands up at the many ripped interfaces and generates a fleecy surface.

The supporting sheet can be extruded along with the hetero sheet. On the other hand, it is also possible, for example, to extrude the melt from slotted dies and produce a stack of sheets. In this event the supporting sheet will either have been coated with a thermoplastic adhesive or be coated with such an adhesive on-line.

It should be noted, in particular, that the sheet can be stretched not only longitudinally and transversely but also in superimposed directions. This will provide the fleece with a "nap" and render it particularly dense.

The composite sheet should be stretched by as much as 300% of its original area. It is also possible to use a low-elasticity supporting sheet that will remain extensively stretched. The result will be less volume and larger area.

Fleeciness and elasticity can be increased if the composite sheet is embossed before being stretched. The composite sheet can be mechanically stretched longitudinally and transversely in a tenter. The composite sheet can also be co-extruded as a tube and the tube sealed and inflated in order to attain the desired fleeciness.

It is also possible to employ a stretchable woven or knit instead of a polymeric sheet.

Another object of the present invention is to employ the aforesaid method not to produce fleeciness for the purpose of improving feel, but to increase the volume of a composite sheet, whether smooth or rough.

This object is achieved by sandwiching between two supporting sheets a hetero sheet that has been rendered fleecy.

The standing up and detachment of the heterogeneous particles is in this event exploited inside the composite sheet to increase its volume.

Particularly recommended is a volume-increased composite sheet comprising five sheets, specifically a supporting sheet against a hetero sheet against another supporting sheet against another hetero sheet against another supporting sheet.

One particular embodiment of the method comprises the steps that will now be described. A composite sheet comprising a hetero sheet between two supporting sheets is extruded. The composite sheet is mechanically stressed, by wrapping it around a short radius for example, detaching the particles of added material distributed within the hetero sheet from the surrounding thermoplastic at their interfaces therewith, such that the material of the hetero sheet stands up at the many ripped sites of detachment, increasing the volume of the composite sheet.

A composite sheet comprising five sheets, specifically a supporting sheet against a hetero sheet against another supporting sheet against another hetero sheet against another supporting sheet can be co-extruded, for example, and then volume-increased.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
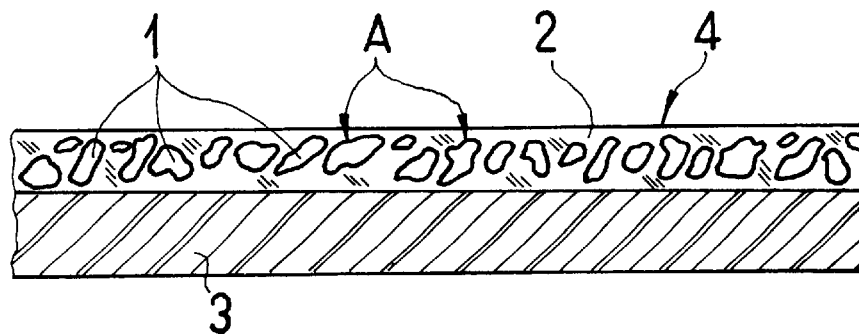
FIGS. 1a, 1b, and 1c are sections through a two-layer composite sheet before, during, and after tentering.

The preferred embodiments of the present invention will now be described with reference to FIGS. 1–6 of the drawings. Identical elements in the various figures are designated with the same reference numerals.

EXAMPLE 1

A composition of 25% by weight of polystyrene particles with a density of 1.05 and 75% by weight of a homopolymerized polypropylene with a density of 0.91 is mixed and plasticized in a plasticizer. The plasticized blend is heated above its melting point and extruded through a slot by a screw. The slot deposits a composition sheet 200 µm thick onto a rolled-out sheet of ethylene propylene diene monomer 150 µm thick with an adhesive surface, producing a composite sheet (FIG. 1a).

Figure 1B:
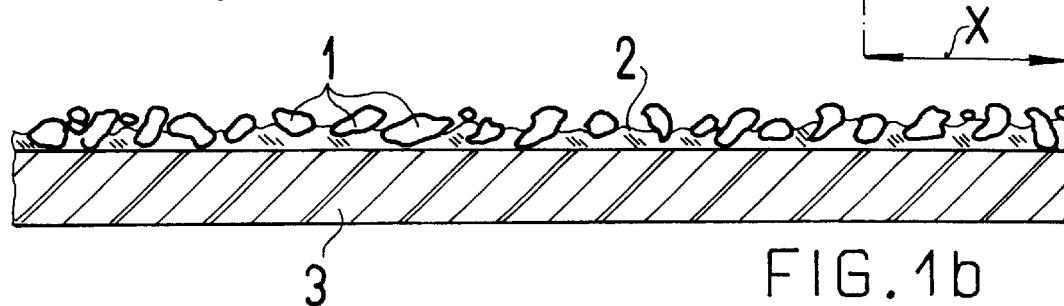
Figure 1C:
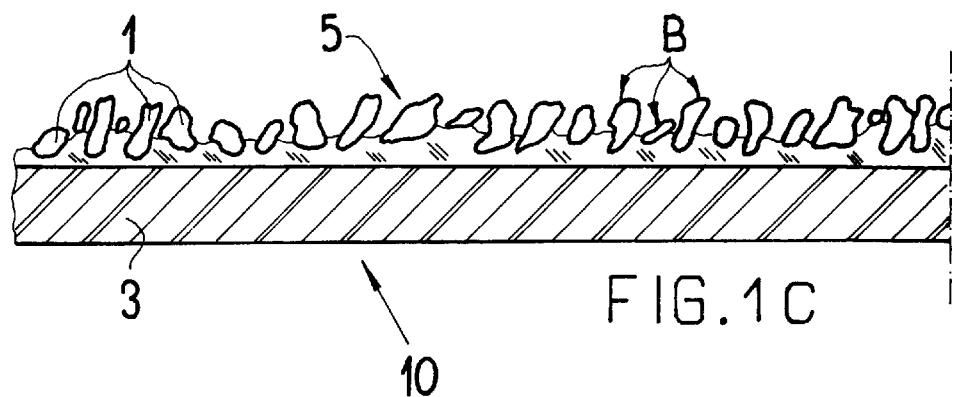

The composite sheet is allowed to cool and then stretched to 150% of its original area (FIG. 1b). The polystyrene particles 1 simultaneously detach from the surrounding polypropylene 2. Rubber sheet 3 is released, and the ripped edges of the interfaces stand up and create a fleecy surface (FIG. 1c).

EXAMPLE 2

The hetero sheet is made of a compositon mixed and plasticized from 30% by weight of titanium dioxide particles and 70% by weight of low density polyethylene. The blend is heated and plasticized and extruded by compressed air through a slot with a filled styrene-and-butadiene rubber. The hetero sheet obtained from the first composition is 80 µm thick and the elastomer sheet 70 µm thick.

The mutually adhering sheets are stretched 120% of their original length. The inorganic particles of titanium dioxide detach from the surrounding low density polyethylene. Once the elastomer sheet returns to size, the ripped edges of the interfaces stand up and create a fleecy surface.

EXAMPLES 3

The hetero sheet is mixed and plasticized from a composition consisting of 25% by weight of a PA6 polyamide particles of density 1.13 and 75% by weight of polypropylene (PP-H) of density 0.91. The supporting sheet is a sheet of styrene-butadiene-styrene elastomer (SBS).

The co-extruded and cool composite sheet is stretched to 125% of its original length both along the direction of flow and perpendicular thereto and allowed to return to its original dimensions. The result is a particularly fleecy feel.

EXAMPLE 4

A preliminary-stage composite sheet produced as described in Examples 1 through 3 is fed through a creping machine with two powered cogwheels, resulting in a corrugating embossment. The sheet of elastomer is stretched and allowed to return to its corrugated state. The result is considerable fleeciness.

EXAMPLE 5

A sheet of elastomer is covered on both sides with a hetero sheet and stretched, producing an area of fleece on each side.

EXAMPLE 6

A stretchable fabric woven or knit from threads of elastomer is employed instead of the sheet of elastomer. This supporting sheet is covered in accordance with the aforesaid method with a hetero sheet and converted to a composite sheet with a fleecy surface.

EXAMPLE 7

A thermoplastic rubber (PUR elastomer) is extruded in a tube extruder along with a compositon consisting of 30% by weight polystyrene particles with a density of 1.05 and 70% by weight of a homopolymeric polypropylene with a density of 0.91. The resulting tube is sealed at one end with a roller. Air is pumped in from below, subjecting the cold or tempered tube to bi-axial inflation tentering. The inflation is terminated and the sheet of elastomer allowed to return to its original state, upon which the sheet of copolymerized composition stands up fleecy.

EXAMPLE 8

Figure 2:
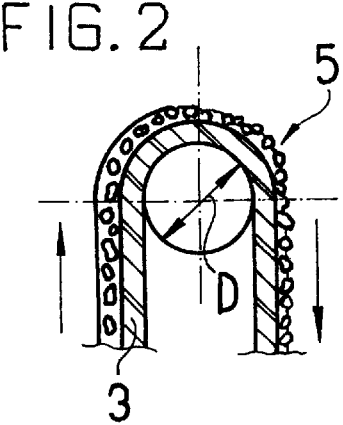
FIG. 2 illustrates a composite sheet like that illustrated in FIG. 1a being tentered around a short radius.

The supporting sheet 3 illustrated in FIG. 2 with a hetero sheet is drawn over a rod of relatively short diameter D, approximately 2 mm, and accordingly mechanically stressed. The bending detaches the added particles from the plastic surrounding them. The material of hetero sheet 5 stands up.

EXAMPLE 9

Figure 3:
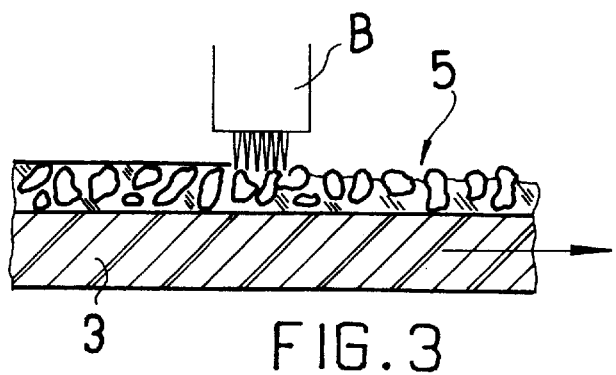
FIG. 3 illustrates a composite sheet being brushed.
Figure 4A:
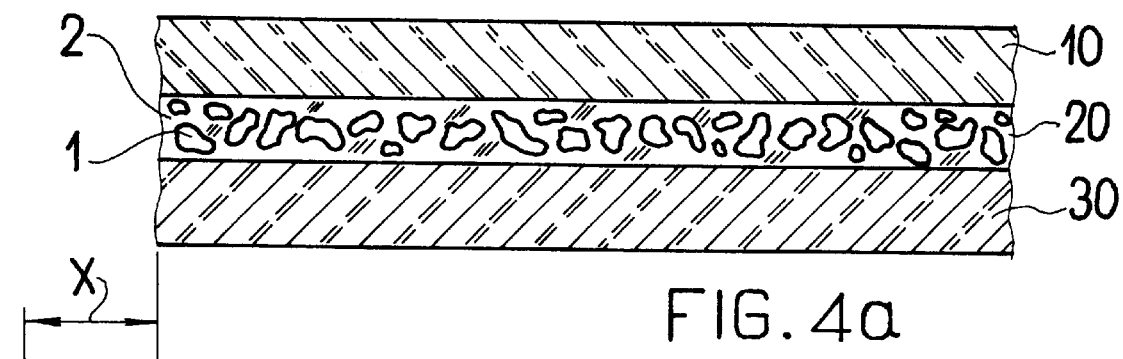
FIGS. 4a, 4b, and 4c are sections through a three-layer composite sheet before, during, and after tentering.
Figure 4B:
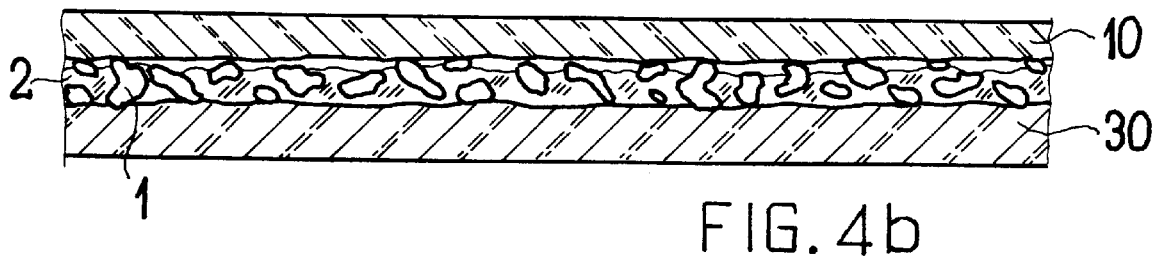
Figure 4C:
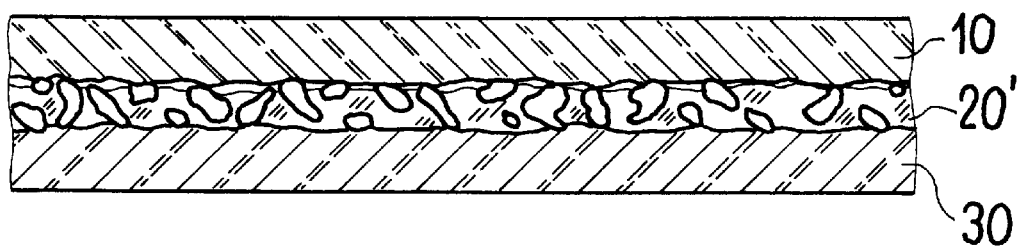

A supporting sheet 3 with a hetero sheet is surface-roughened by brushing it with a brush B as shown in FIG. 3. The mechanical stress detaches the added particles from the plastic supporting sheet that surrounds them. The material of hetero sheet 5 stands up.

EXAMPLE 10

A hetero sheet is obtained by mixing and plasticizing in a plasticizer a composition consisting of 25% by weight of polystyrene particles of density 1.05 and 75% by weight of a homopolymerized polypropylene of weight 0.91. The plasticized blend is forwarded above its melting point to an annular cavity in a tube extruder. Extruded along with the aforesaid hetero sheet through two annular cavities concentric with the first is a supporting sheet in the form of a molten composition of ethylene propylene diene monomer with a tacky surface. The result is a co-extruded tube of composite sheet in the state illustrated in FIG. 4a. This composite sheet consists of a supporting sheet 10, a hetero sheet 20, and another supporting sheet 30. The unstretched hetero sheet is 200 µm thick and the unstretched supporting sheet 100 µm thick.

The tube is then slit and laid out in two separate layers. The composite sheet is allowed to cool (FIG. 4a) and stretched to 150% of its original length (illustrated in FIG. 4b). The heterogeneous polystyrene particles 1 in the middle layer simultaneously detach from the surrounding polypropylene 2. The sheet is tentered and the composite sheet allowed to return to its original dimensions subject to the recovery force exerted by the ethylene propylene diene monomer rubber sheet. The ripped edges of the interfaces simultaneously stand up and create, in conjunction with the now more randomly erect polystyrene particles 1, a larger-volume middle layer (illustrated in FIG. 4c).

EXAMPLE 11

Figure 5:
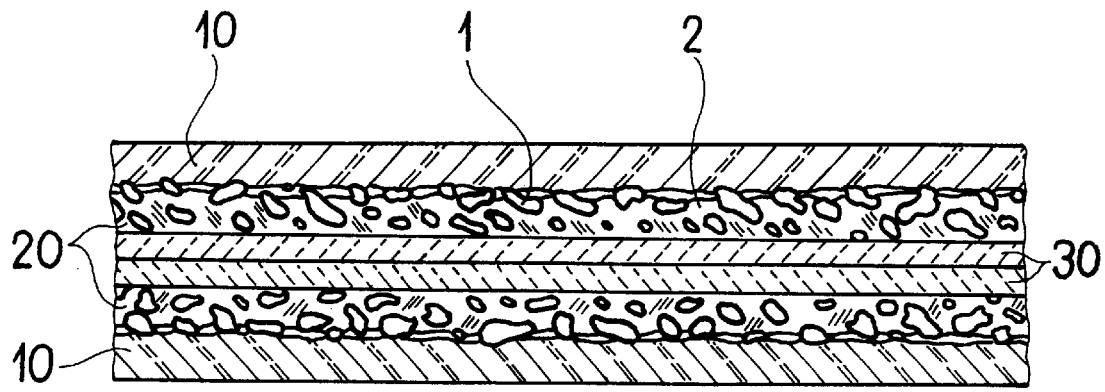
FIG. 5 illustrates a five-layer composite sheet after tentering.

It is also possible to produce a five-layer composite sheet as illustrated in FIG. 5 by stacking flat and blocking two of the tubes discussed in Example 1, resulting in a simple supporting sheet 10 against a hetero sheet 20 against a double supporting sheet 30+30 against another hetero sheet 20 against another simple supporting sheet 10. Stretching such a five-layer composite sheet will in principle have the effect with respect to increased volume represented in FIG. 1c.

EXAMPLE 12

A composition comprising 30% by weight of titanium dioxide particles and 70% by weight of low density polyethylene is manufactured and plasticized. The heated and plasticized blend is extruded through a die along with a filled styrene-butadiene rubber. The hetero sheet from the first composition will accordingly be 80 $\mu$m thick and the elastomer sheet 70 $\mu$m thick. The still hot tube is laid flat against itself and blocked, resulting in a supporting sheet 10 against a double hetero sheet 20+20 against another supporting sheet 10.

The three mutually adhering sheets are stretched 120% of their original length, the inorganic titanium-dioxide particles detaching from the surrounding low density polyethylene. The elastomer sheets are allowed to return to their original dimensions, and the ripped edges of the interfaces stand up and constitute, in conjunction with the inorganic titanium-dioxide particles, a milky inner layer with an increased volume.

EXAMPLE 13

The hetero sheet is mixed and plasticized from a composition comprising 25% by weight PA6 polyamide particles of density 1.13 and 75% by weight polypropylene H of density 0.91. The supporting sheet is a sheet of styrene-butadiene-styrene elastomer. The two substances are co-extruded in a tube extruder. The still hot tube is folded over itself and blocked, resulting in a composite sheet comprising a supporting sheet against a double hetero sheet against another supporting sheet.

The composite sheet is allowed to cool, stretched to 125% of its original length along the direction of flow and at a right angle thereto, and allowed to return to its original dimensions. The result is a particularly fleecy feel.

EXAMPLE 14

A composite sheet manufactured as described in one of Examples 1 through 3 is fed through a creping machine with two powered cogwheels, producing a corrugated embossment. The material is then stretched and the elastomer sheet allowed to return to its corrugated state. The volume is simultaneously increased considerably.

EXAMPLE 15

A hetero sheet is sandwiched between two elastomer sheets and another hetero sheet co-extruded onto each side. The composite sheet is allowed to cool and stretched, resulting in a fleecy surface on each side and an increased volume inside.

EXAMPLE 16

A thermoplastic rubber (PUR elastomer) is extruded in a tube extruder along with a composition of 30% by weight of polystyrene particles of density 1.05 and 70% by weight of a homopolymeric polypropylene of density 0.91. The tube is sealed at one end with a roller. Air is pumped in from below, subjecting the cool or tempered tube to biaxial tentering. The elastomer tube is allowed to return to its original dimensions, upon which the co-polymerized composition sheet will stand up and create a fleece. The fleecy surfaces are laid together, heated with infrared radiation, and accordingly blocked with no sacrifice in volume.

EXAMPLE 17

Figure 6:
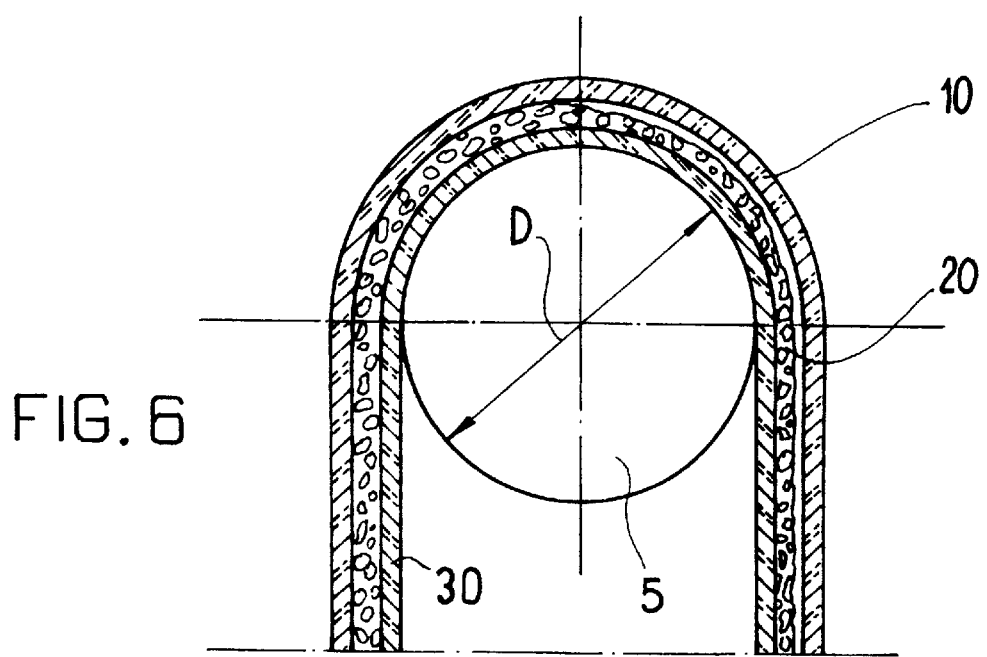
FIG. 6 illustrates a composite sheet like that illustrated in FIG. 4a being tentered around a short radius.

A co-extruded composite sheet comprising two supporting sheets 10 and 30 and a hetero sheet 20 between them, as illustrated FIG. 6, is drawn over a rod 5 with a relatively short diameter D, say 2 mm, and accordingly mechanically stressed. The bending causes the added particles to detach from the surrounding plastic supporting sheet. The material in the hetero sheet stands up and increases the volume.

There has thus been shown and described a novel composite sheet and method of manufacture thereof which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A composite sheet comprising an elastomeric supporting sheet, said supporting sheet being bonded to a hetero sheet comprising a heterogeneous blend of: (1) an elastic thermoplastic, polyolefin matrix, that cures semicrystalline or amorphous subsequent to heat processing and (2) particles, distributed in the matrix, of another material selected from the group consisting of polystyrene and polyamide; wherein the particles are mixed and extruded along with the matrix, and wherein the particles of said another material are detached from the surrounding matrix at their interfaces therewith and the matrix of the hetero sheet stands up at the areas where it is detached.

2. The composite sheet defined in claim 1, wherein the matrix of the hetero sheet is a polymer selected from the group consisting of a polyolefin, a polyamide, a polycarbonate, a polyester and copolymers thereof.

3. The composite sheet defined in claim 1, wherein the another material is an inorganic filler selected from the group consisting of titanium dioxide, lampblack, kaolin, ground quartz, silicic acid, chalk and lithophone.

4. The composite sheet defined in claim 1, wherein the matrix is a polyolefin selected from the group consisting of polyethylene and polypropylene.

5. The composite sheet defined in claim 1, wherein said elastomeric supporting sheet is ethylene propylene diene monomer or styrene-butadiene-styrene copolymer.

6. The composite sheet defined in claim 1, wherein the hetero sheet is bonded to the supporting sheet with a thermoplastic adhesive.

7. The composite sheet defined in claim 1, wherein the supporting sheet comprises more than one layer.

8. The composite sheet defined in claim 1, further comprising another supporting sheet placed on top of the exposed surface of the hetero sheet, which is thereby sandwiched between two supporting sheets.

9. The composite sheet defined in claim 1, further comprising a second supporting sheet on the exposed surface of said hetero sheet, a second hetero sheet on top of the second supporting sheet and a third supporting sheet on top of the exposed surface of the second hetero sheet, thereby forming a laminate.

10. A composite sheet comprising a supporting sheet selected from the group consisting of an elastomer of an ethylene propylene diene monomer and a styrene butadiene styrene copolymer, said supporting sheet being bonded to a hetero sheet comprising a heterogeneous blend of: (1) an elastic thermoplastic matrix, that cures semicrystalline or amorphous subsequent to heat processing, and (2) particles of another material distributed in the matrix, wherein the particles are mixed and extruded along with the matrix, and wherein the particles of said another material are detached from the surrounding matrix at their interfaces therewith and the matrix of the hetero sheet stands up at the areas where it is detached.

11. A composite sheet comprising a first supporting sheet of an elastomer, said supporting sheet being bonded to a first hetero sheet comprising a heterogeneous blend of: (1) an elastic thermoplastic matrix, that cures semicrystalline or amorphous subsequent to heat processing, and (2) particles of another material distributed in the matrix, wherein the particles are mixed and extruded along with the matrix, and wherein the particles of said another material are detached from the surrounding matrix at their interfaces therewith and the matrix of the first hetero sheet stands up at the areas where it is detached, said composite sheet further comprising a second supporting sheet on the exposed surface of the first hetero sheet, a second hetero sheet on top of the second supporting sheet and a third supporting sheet on top of the exposed surface of the second hetero sheet, thereby forming a laminate.

12. The composite sheet defined in claim 11, wherein the matrix of the hetero sheet is a polyolefin.

13. The composite sheet defined in claim 11, wherein said another material is a filler selected from the group consisting of a polystyrene or polyamide.

* * * * *